(No Model.)

P. H. HOLMES.
PULLEY.

No. 492,801. Patented Mar. 7, 1893.

Witnesses
E. J. Nottingham
H. B. Ames.

Inventor
P. H. Holmes.
By H. A. Simmons.
Attorney

UNITED STATES PATENT OFFICE.

PHILIP H. HOLMES, OF GARDINER, MAINE.

PULLEY.

SPECIFICATION forming part of Letters Patent No. 492,801, dated March 7, 1893.

Application filed December 29, 1891. Serial No. 416,437. (No model.)

*To all whom it may concern:*

Be it known that I, PHILIP H. HOLMES, of Gardiner, in the county of Kennebec and State of Maine, have invented certain new and useful Improvements in Pulleys; and I do hereby declare the following to be a full, clear, and exact description of the invention, such as will enable others skilled in the art to which it appertains to make and use the same.

My invention relates to an improvement in truss pulleys, the object being to provide a light cheap and durable pulley the spokes of which are so arranged that the power exerted by the belt in driving is transmitted tangentially to the opposite sides of the hub and shaft.

A further object is to provide a durable pulley of extremely light weight, thus decreasing the weight on the shaft and decreasing the friction of the shaft in its boxes.

A further object is to provide a pulley the parts of which can be quickly and easily assembled.

With these ends in view, my invention consists in certain novel features of construction and combinations of parts as will be hereinafter more fully described and pointed out in the claims.

Figure 1:
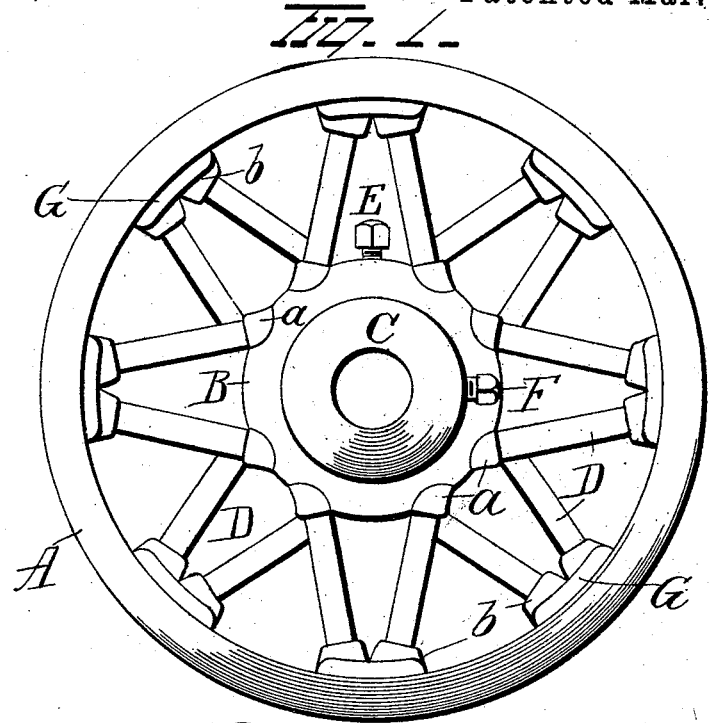
Figure 2:
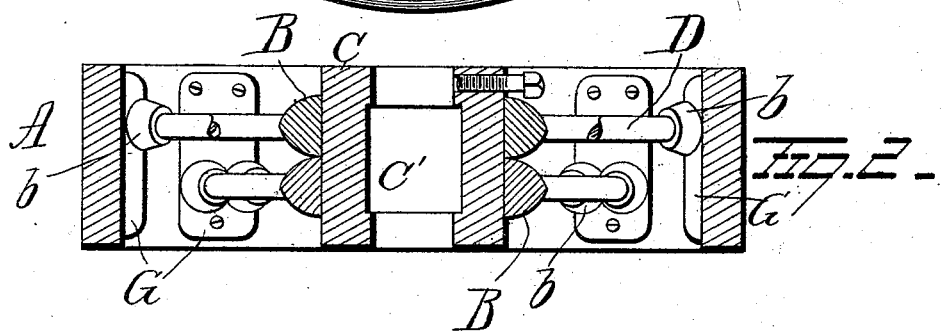
Figure 3:
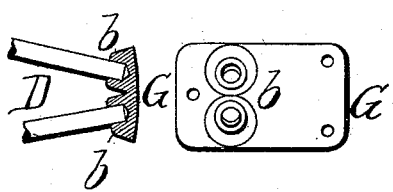
Figure 3:
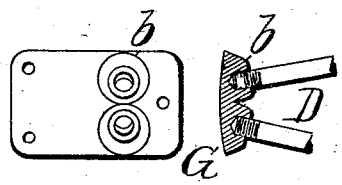
Figure 3:
Figure 4:
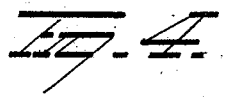

In the accompanying drawings, Figure 1 is a plan view. Fig. 2 is a sectional view, and Figs. 3 and 4 are detailed views of the manner of fastening the spokes.

A represents the rim of the pulley, composed of wood or other fiber compressed in proper molds, the outer or belt surface of same being preferably left in a slightly roughened condition. By slightly roughened, I do not mean that the surface is ridged, or provided with elevations and depressions, but mean simply that the outer surface is not smooth finished, but is left practically in the condition as it comes from the mold, its surface somewhat resembling leather. This adds considerably to the driving power of the pulley and permits of the employment of a narrower belt. The metal hub C is preferably chambered at C', and is provided with a cylindrical outer surface, and with a bore shaped to fit the shaft. As this hub is removable it is evident that hubs having bores of various sizes can be secured within the spoke ring or rings. The spoke ring B is also made of metal and is shaped to fit the hub C, and is provided on its outer surface with a series of (preferably eight) sockets *a* arranged in pairs, and tangentially to the hub, the sockets *a* of each pair diverging so that the spokes secured within the sockets rest approximately tangentially to the hub on opposite sides thereof. Each pair of spokes D converge outwardly, and the outer ends of each pair are secured within sockets *b* formed in plates G, each plate having two sockets for the reception of the ends of one pair of spokes. From the foregoing it will be seen, that while the outer ends of each pair of spokes are close together the spokes themselves form trusses and are in planes passing through the hub or hub rings on opposite sides of the center of the hub. The plates G having sockets *b* therein, are secured to the inner face of the rim of the pulley, by screws or otherwise, and the spoke ring B is secured to the hub C by set screw E.

In small pulleys a single spoke ring with its spokes and plates G will be sufficient, but for larger pulleys two or more rings with spokes and plates G can be employed. In the drawings I have shown two sets, with the spokes alternating and on opposite sides of the center of the pulley.

In assembling the parts the spokes are secured to their ring or rings and plates G, and the pulley rim is then placed in position after which the plates G are secured to the rim. The hub can then be inserted and is held in place by the screws E. The sockets in plates G and rings B may be drilled of proper size to receive the spokes D, and the ends of said spokes when of metal, may be screw threaded and provided with nuts bearing against socket bosses on the lugs and rings by means of which the spokes may be strained against the rim if necessary. The pulley may be secured to shaft by the set screws F or by means of keys. The pulley rim, rings and hub as shown in drawings are each in one continuous piece, but they may be made in halves if required, in which case the rim, rings and hub are split and fastened together by means of bolts passing through proper ears on the several parts. The spokes of the pulley are so arranged that the pressure exerted by the belt in driving is transmitted from one member to another as in a truss, and as will be seen from the drawings, as many sets of spokes may be used as are necessary to give the rim proper support and transmit the required amount of power. The arrangement of the hub C is such that when a change is made in the size of the shaft, the same pulley may be used by merely changing the hub and replacing it with one of proper bore to fit the new shaft; this change is effected without any great loss of time as the means for securing the hub are very simple. The weight of the pulley is considerably less than the weight of ordinary pulleys of the same size thus decreasing the weight on the shaft where they are used.

It is evident that many slight changes may be made in the relative arrangement and construction of parts without departing from the spirit and scope of my invention and hence I would have it understood that I do not limit myself to the exact construction of parts herein shown and described, but, Having fully described my invention, what I claim as new, and desire to secure by Letters Patent, is—

1. In a pulley the combination with a rim and a hub ring, of spokes arranged in pairs with their outer ends resting in seats in the rim, the said spokes of each pair diverging inwardly and engaging the hub ring tangentially and on planes transverse to the axis of the hub as shown, and a hub removably secured within the ring, substantially as set forth.

2. In a pulley, the combination, with a rim and a hub, of two independent rings removably secured to the hub, and spokes resting at their outer ends in seats in the rim, and at their inner ends in seats in the rings, substantially as set forth.

3. The combination, with a compressed fiber rim, plates secured to the inner face thereof, a hub, and independent rings removably secured to the hub, of spokes resting at their outer ends in seats in the plates, and at their inner ends in seats in the rings, substantially as set forth.

4. The combination, with a compressed fiber rim and plates secured to the inner face thereof, each plate having two spoke seats therein, of a hub, independent rings removably secured to the hub, each ring having seats for the ends of spokes, and spokes secured at their ends in the seats in the plates and in the rings, substantially as set forth.

In testimony whereof I have signed this specification in the presence of two subscribing witnesses.

PHILIP H. HOLMES.

Witnesses:
GEO. F. DOWNING,
A. W. BRIGHT.